US007137886B2

(12) United States Patent
Locke et al.

(10) Patent No.: US 7,137,886 B2
(45) Date of Patent: Nov. 21, 2006

(54) MATCHING GAME FOR A GAMING MACHINE

(75) Inventors: David K. Locke, Des Plaines, IL (US); Joel R. Jaffe, Evanston, IL (US); Eric M. Pryzby, Skokie, IL (US)

(73) Assignee: WMS Gaming, Inc., Waukegan, IL (US)

( * ) Notice: Subject to any disclaimer, the term of this patent is extended or adjusted under 35 U.S.C. 154(b) by 527 days.

(21) Appl. No.: 10/158,723

(22) Filed: May 30, 2002

(65) Prior Publication Data

US 2003/0022711 A1 Jan. 30, 2003

Related U.S. Application Data

(60) Provisional application No. 60/298,680, filed on Jun. 15, 2001.

(51) Int. Cl.
*A63F 13/00* (2006.01)

(52) U.S. Cl. .................................................. 463/20

(58) Field of Classification Search ........... 463/16–22, 463/25, 30, 37; 273/138.1, 139

See application file for complete search history.

(56) References Cited

U.S. PATENT DOCUMENTS

| | | | | |
|---|---|---|---|---|
| 6,015,346 | A | 1/2000 | Bennett | 463/20 |
| 6,089,976 | A | 7/2000 | Schneider et al. | 463/16 |
| 6,346,043 | B1 | 2/2002 | Colin et al. | 463/17 |
| 6,347,996 | B1 | 2/2002 | Gilmore et al. | 463/17 |
| 6,364,767 | B1 * | 4/2002 | Brossard et al. | 463/20 |
| 2002/0160830 | A1 * | 10/2002 | Stern | 463/20 |

OTHER PUBLICATIONS

Article, “Instant Winner”, *Strictly Slots*, Aug. 1999. p. 45.
Article, “Yukon Gold”, *Strictly Slots*, Jun. 2001, p. 53.

* cited by examiner

*Primary Examiner*—Kim Nguyen
(74) *Attorney, Agent, or Firm*—Jenkens & Gilchrist

(57) ABSTRACT

A gaming machine conducts a wagering game in response to a wager. The machine provides a first group of first elements and a second group of second elements. A first element from the first group is selected and then compared to one or more second elements in the second group. The machine awards a payout based on any matches between the selected first element and the one or more second elements in the second group. The second elements may be ranked, and the payout may be based on the rank of any second elements that match the selected first element.

18 Claims, 18 Drawing Sheets

MATCHING GAME FOR A GAMING MACHINE

REFERENCE TO RELATED APPLICATION

This application claims the benefit of U.S. Provisional Application No. 60/298,680, filed Jun. 15, 2001.

FIELD OF THE INVENTION

The present invention relates generally to gaming machines for playing games of chance and, more particularly, to a matching game for a gaming machine.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome of the basic game. Because the bonus game concept offers tremendous advantages in player appeal and excitement relative to other known games, and because such games are attractive to both players and operators, there is a continuing need to develop new features and themes for bonus games to satisfy the demands of players and operators. Preferably, such new bonus game features and themes will maintain, or even further enhance, the level of player excitement offered by bonus games heretofore known in the art. The present invention is directed to satisfying these needs.

SUMMARY OF THE INVENTION

A gaming machine conducts a wagering game in response to a wager. The machine provides a first group of first elements and a second group of second elements. A first element from the first group is selected and then compared to one or more second elements in the second group. The machine awards a payout based on any matches between the selected first element and the one or more second elements in the second group. The second elements may be ranked, and the payout may be based on the rank of any second elements that match the selected first element.

BRIEF DESCRIPTION OF THE DRAWINGS

The foregoing and other advantages of the invention will become apparent upon reading the following detailed description and upon reference to the drawings in which.

Figure 1:
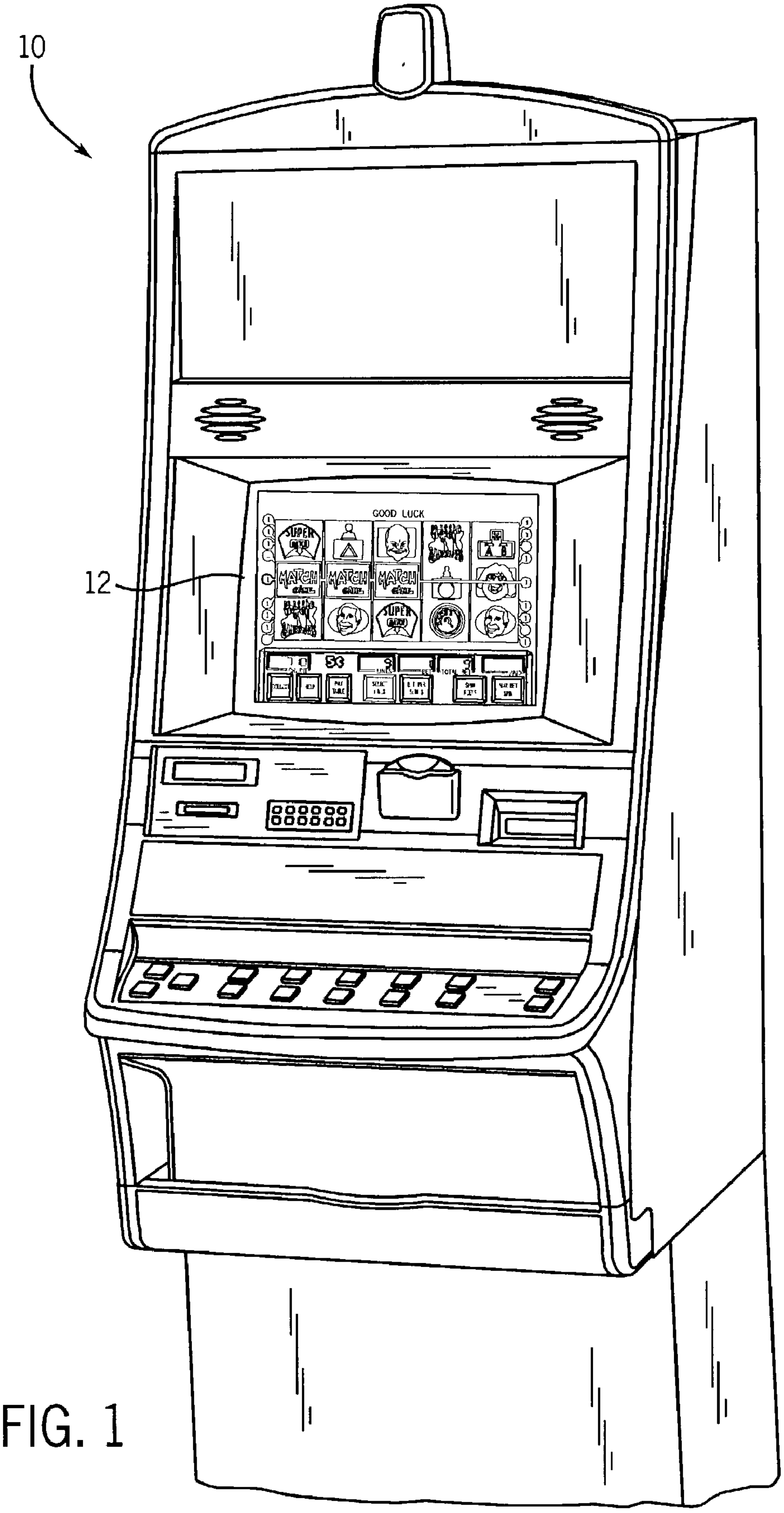
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, a gaming machine 10 operable to play a wagering game having a game show theme based on the television game show entitled MATCH GAME. The wagering game features a basic slot game with five simulated spinning reels and one or more bonus games triggered by respective start-bonus outcomes in the basic slot game. The gaming machine 10 includes lower and upper video displays 12 and 13 each implemented with a CRT, LCD, plasma, or other type of video display known in the art. The lower display 12 preferably includes a touch screen overlaying the monitor. In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10.

Figure 2:
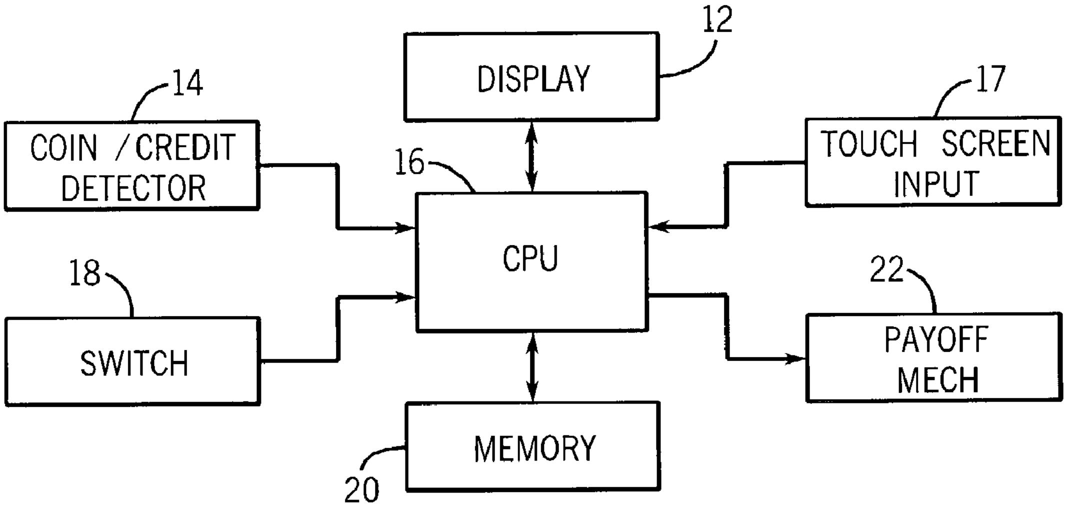
FIG. 2 is a block diagram of a control system suitable for operating the gaming machine.

FIG. 2 is a block diagram of a control system suitable for operating the gaming machine 10. Coin/credit detector 14 signals a central processing unit ("CPU") 16 when a player has inserted a number of coins or played a number of credits. Then, the CPU 16 operates to execute a game program that causes the lower display 12 to display the basic game that includes simulated symbol-bearing reels. The player may select the number of pay lines to play and the amount to wager via touch screen input keys 17. The basic game commences in response to the player activating a switch 18 (e.g., by pulling a lever or pushing a button), causing the CPU 16 to set the reels in motion, randomly select a game outcome, and then stop the reels to display symbols corresponding to the pre-selected game outcome. In one embodiment, some of the basic game outcomes cause the CPU 16 to enter respective bonus modes whereby the display 12 shows a bonus matching game.

A system memory 20 stores control software, operational instructions and data associated with the gaming machine 10. In one embodiment, the memory 20 comprises a separate read-only memory (ROM) and battery-backed random-access memory (RAM). However, it will be appreciated that the system memory 20 may be implemented on any of several alternative types of memory structures or may be implemented on a single memory structure. A payoff mechanism 22 is operable in response to instructions from the CPU 16 to award a payoff of coins or credits to the player in response to certain winning outcomes which might occur in the basic or bonus games. The payoff amounts corresponding to certain combinations of symbols in the basic game is predetermined according to a pay table stored in system memory 20. The payoff amounts corresponding to certain outcomes of the bonus games are also stored in system memory 20.

Figure 3:
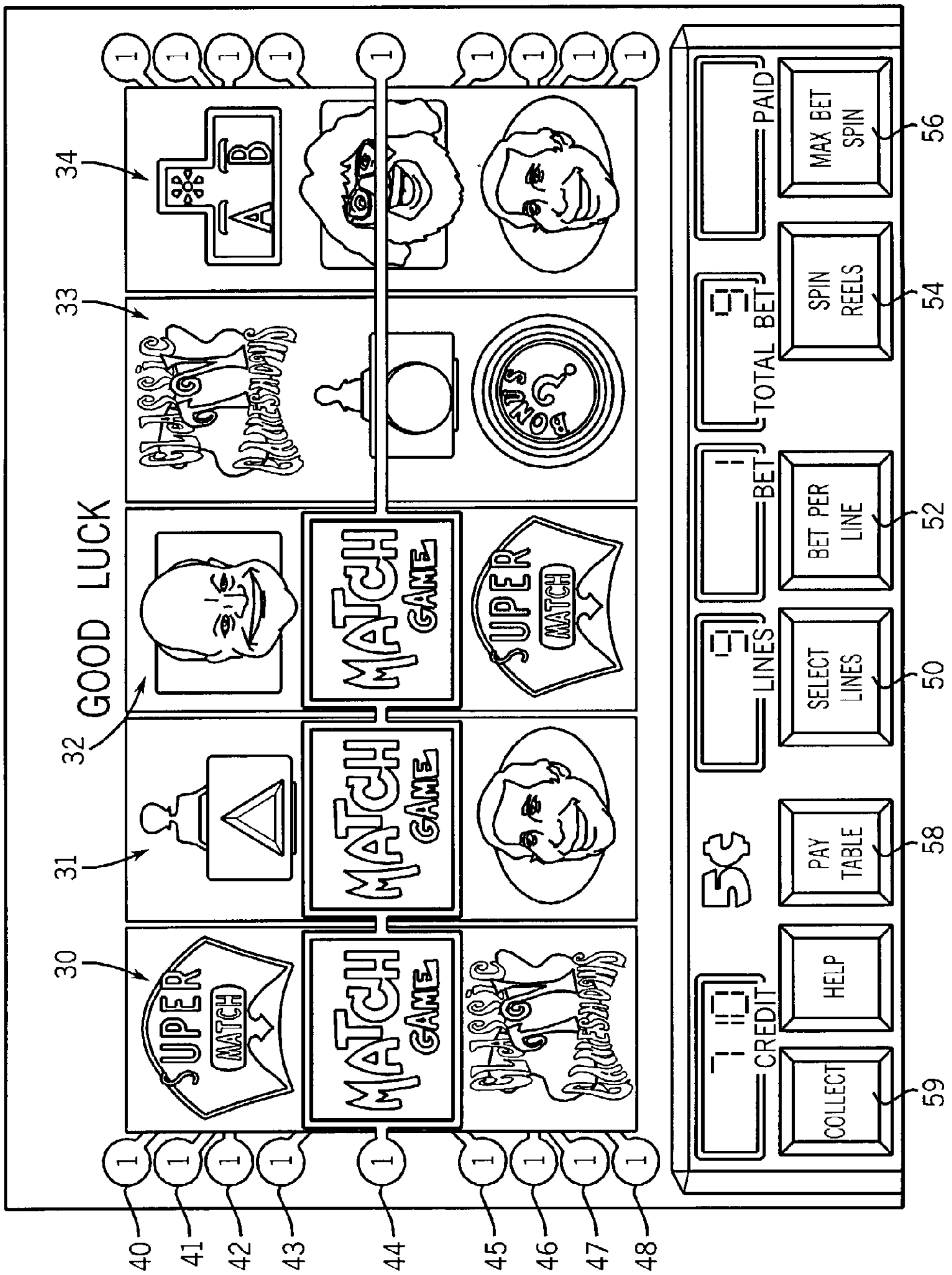
FIG. 3 is a display image showing a start-bonus combination in a basic slot game for triggering a MATCH GAME bonus game.

As shown in FIG. 3, the basic game is implemented on the lower display 12 on five video simulated spinning reels 30–34 with nine pay lines 40–48. Each of the pay lines 40–48 extends through one symbol on each of the five reels 30–34. Generally, game play is initiated by inserting a number of coins or playing a number of credits, causing the CPU 16 (FIG. 2) to activate a number of pay lines corresponding to the number of coins or credits played. In one embodiment, the player selects the number of pay lines (between one and nine) to play by pressing a "Select Lines" key 50 on the video display 12. The player then chooses the number of coins or credits to bet on the selected pay lines by pressing the "Bet Per Line" key 52.

After activation of the pay lines, the reels 30–34 may be set in motion by touching the "Spin Reels" key 54 or, if the player wishes to bet the maximum amount per line, by using the "Max Bet Spin" key 56 on the video display 12. Alternatively, other mechanisms such as, for example, a lever or push button may be used to set the reels in motion. The CPU 16 uses a random number generator to select a game outcome (e.g., "basic" game outcome) corresponding to a particular set of reel "stop positions." The CPU 16 then causes each of the video reels 30–34 to stop at the appropriate stop position. Video symbols are displayed on the reels 30–34 to graphically illustrate the reel stop positions and indicate whether the stop positions of the reels represent a winning game outcome.

Winning basic game outcomes (e.g., symbol combinations resulting in payment of coins or credits) are identifiable to the player by a pay table. In one embodiment, the pay table is affixed to the machine 10 and/or displayed by the video display 12 in response to a command by the player (e.g., by pressing the "Pay Table" button 58). A winning basic game outcome occurs when the symbols appearing on the reels 30–34 along an active pay line correspond to one of the winning combinations on the pay table. A winning combination, for example, could be three or more identical symbols along an active pay line, where the award is greater as the number of identical symbols along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing the "Collect" button 59. In one implementation, the winning combinations start from the first reel 30 (left to right) and span adjacent reels. In an alternative implementation, the winning combinations start from either the first reel 30 (left to right) or the fifth reel 34 (right to left) and span adjacent reels.

Included among the plurality of basic game outcomes are one or more start-bonus outcomes for triggering play of respective bonus games. A start-bonus outcome may be defined in any number of ways. For example, a start-bonus outcome occurs when a special start-bonus symbol or a special combination of symbols appears on one or more of the reels 30–34. The start-bonus outcome may require the combination of symbols to appear along an active pay line, or may alternatively require that the combination of symbols appear anywhere on the display regardless of whether the symbols are along an active pay line. The appearance of a start-bonus outcome causes the CPU to shift operation from the basic game to the associated bonus matching game.

Figure 4:
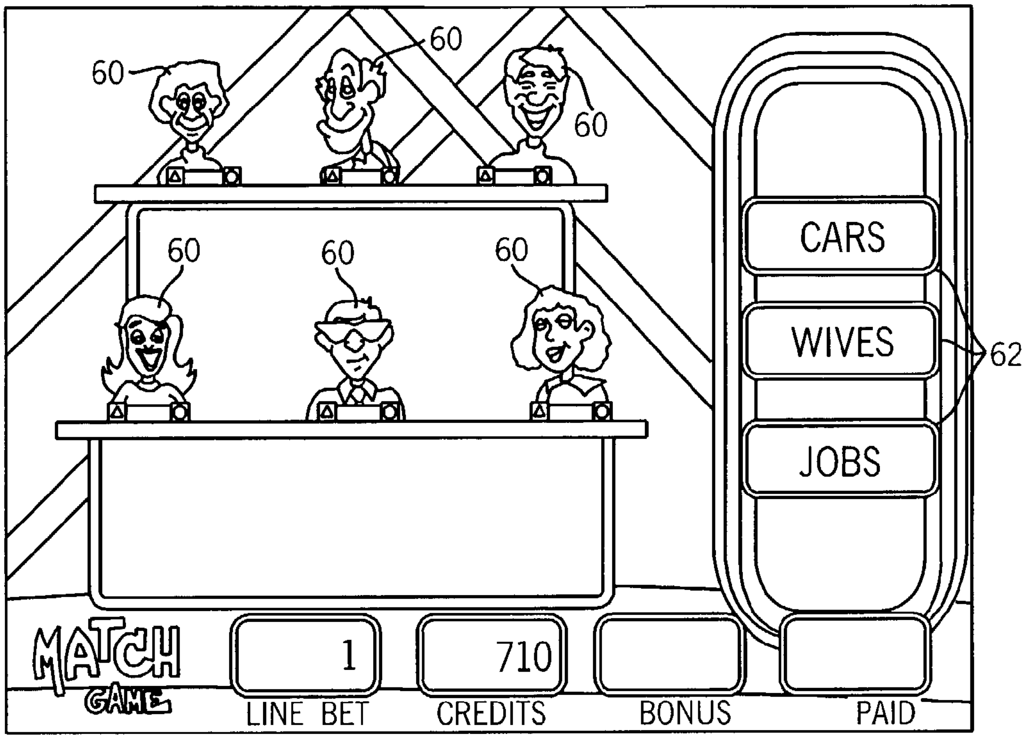
FIGS. 4 through 7 are display images associated with the MATCH GAME bonus game.
Figure 5:
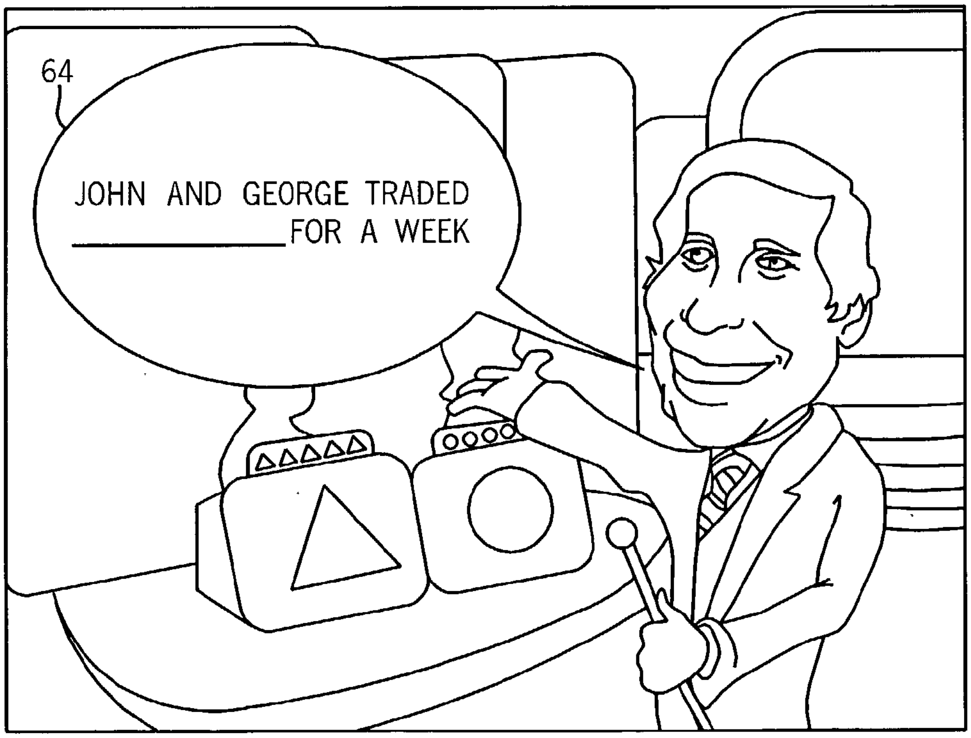

As shown in FIG. 3, the appearance of three or more MATCH GAME logo symbols along an active pay line triggers the MATCH GAME bonus game. The MATCH GAME bonus game is presented by both the lower and upper video displays 12 and 13. Referring to FIGS. 4 and 5, the lower display 12 depicts six celebrities 60 and three possible answers 62 for completing a short humorous paragaph 64 read by a game show host (e.g., Gene Rayburn) on the upper display 13. For example, the paragraph 64 may read as follows: "John and George traded [blank] for a week." The possible answers 62 for completing the paragraph 64 may include "cars", "wives", and "jobs". The player is prompted to select one of the possible answers 62 for completing the paragraph 64.

Figure 6:
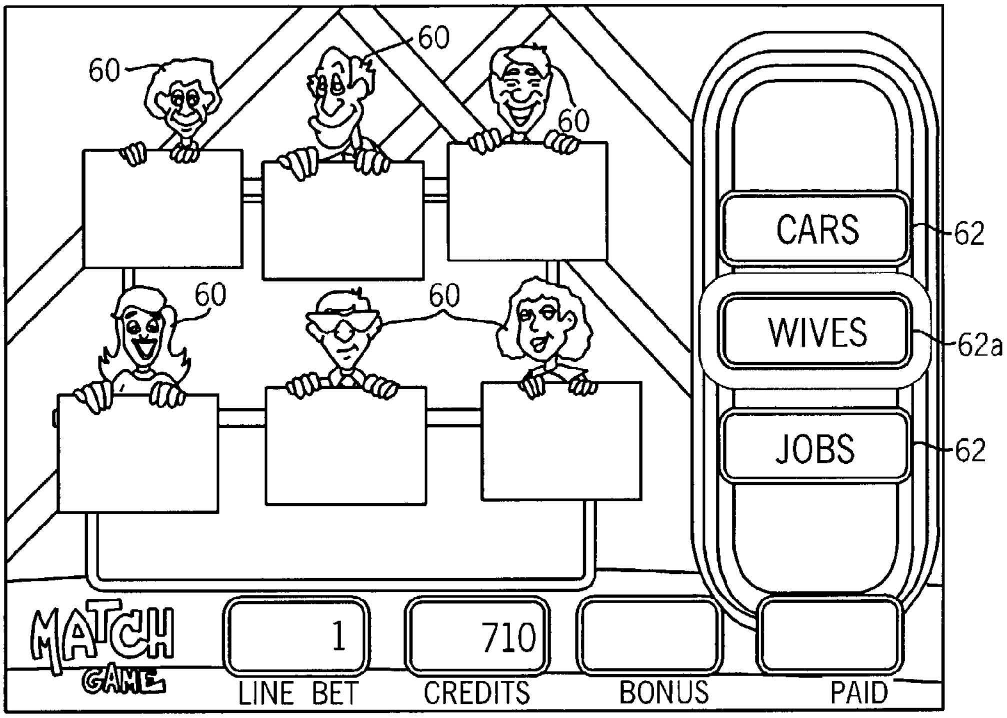
Figure 7:
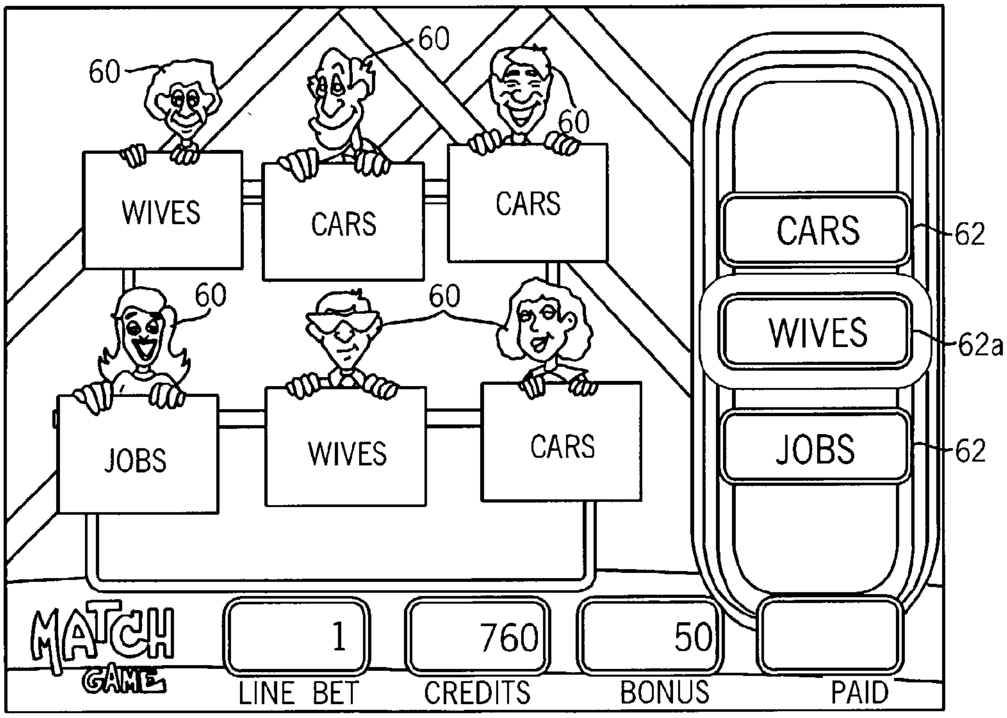

Referring to FIGS. 6 and 7, in response to one of the answers 62 (e.g., "wives") being selected by the player via the touch screen, the animated celebrities 60 reveal their answers, one at a time, until all of the celebrities 60 have revealed their answers as shown in FIG. 7. Each celebrity 60 may deliver a humorous remark as he or she reveals his or her respective answer. The CPU randomly selects the answer for each celebrity 60 from the three possible answers 62.

The CPU awards a bonus based on a number of matches between (1) the answer 62*a* selected by the player and (2) the answers subsequently revealed by the celebrities 60. In the illustrated example, the answer 62*a* selected by the player is "wives", and two of the six celebrities 60 revealed a matching answer. The bonus may, for example, be a credit amount multiplied by the player's line bet in the basic slot game. The bonus may increase for successive matches as illustrated, decrease for successive matches, or remain constant. The bonus game may be provided with a pay table in which a certain number of matches is worth a predetermined credit amount multiplied by the player's line bet. The pay table may, for example, appear as below:

| Number of Matches | Credits (x Line Bet) |
|---|---|
| 0 | 10 |
| 1 | 25 |
| 2 | 50 |
| 3 | 100 |
| 4 | 250 |
| 5 | 500 |
| 6 | 1000 |

Using such a pay table, the two matches in the illustrated example yield a bonus of 50 credits multiplied by the player's line bet. After the completion of the MATCH GAME bonus game, the CPU shift operation back to the basic slot game.

Figure 8:
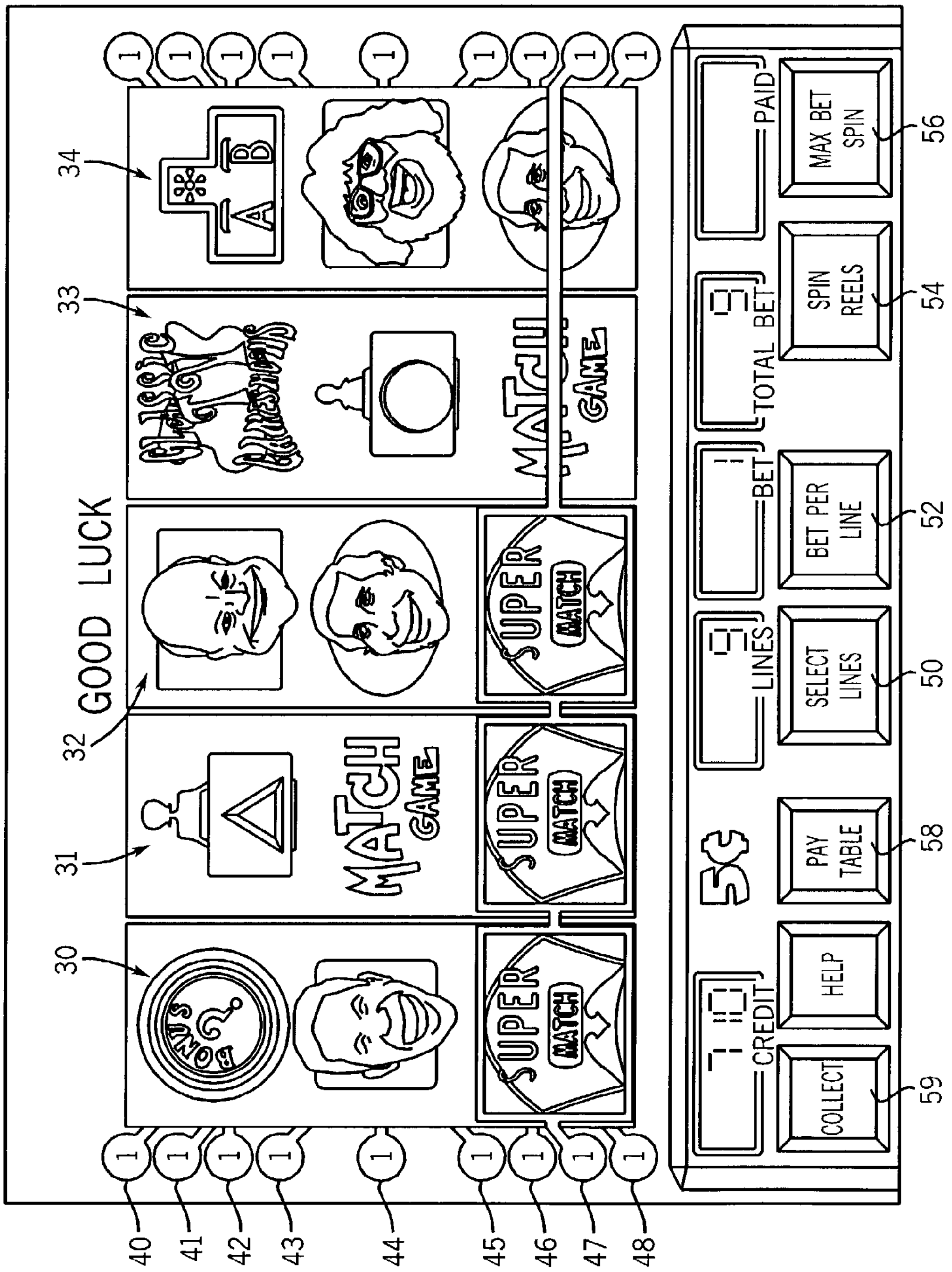
FIG. 8 is a display image showing a start-bonus combination in the basic slot game for triggering a SUPER MATCH bonus game.

As shown in FIG. 8, the appearance of three or more SUPER MATCH symbols along an active pay line triggers the SUPER MATCH bonus game. In an alternative embodiment, the SUPER MATCH bonus game is triggered by the MATCH GAME bonus game if, for example, the number of matches in the MATCH GAME bonus game is greater than or equal to a predetermined number (e.g., four matches). The SUPER MATCH bonus game includes two portions: an "Audience Match" portion and a "Head to Head Match" portion. The SUPER MATCH bonus game commences with the "Audience Match" portion.

Figure 9:
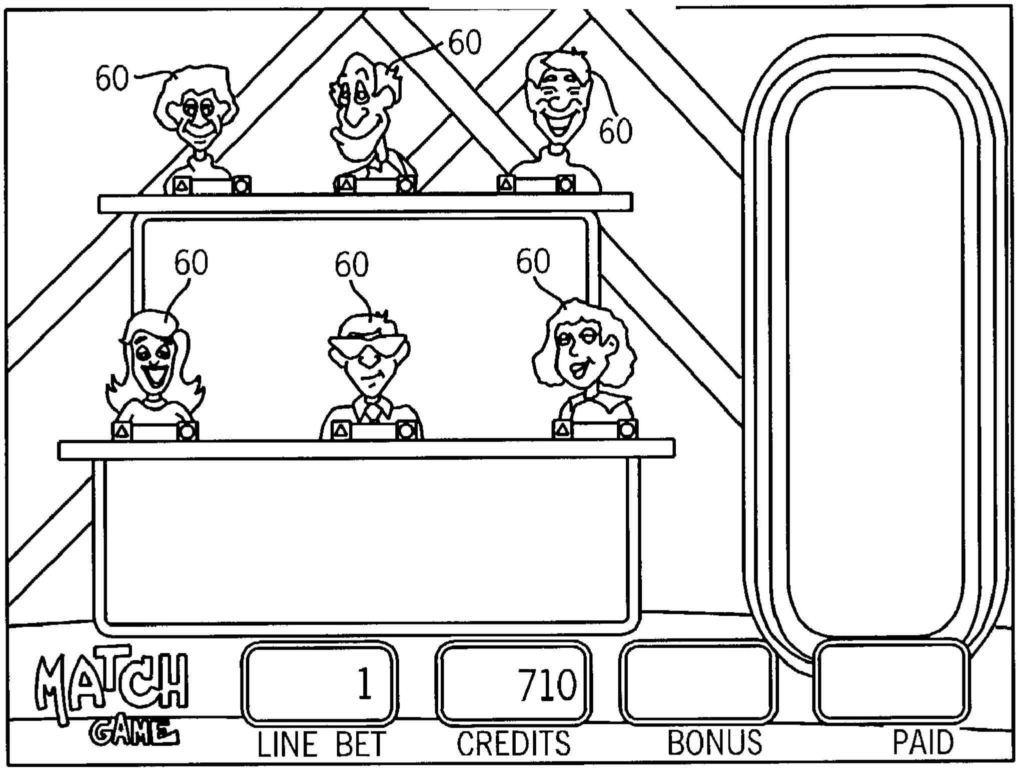
FIGS. 9 through 17 are display images associated with the SUPER MATCH bonus game.
Figure 10:
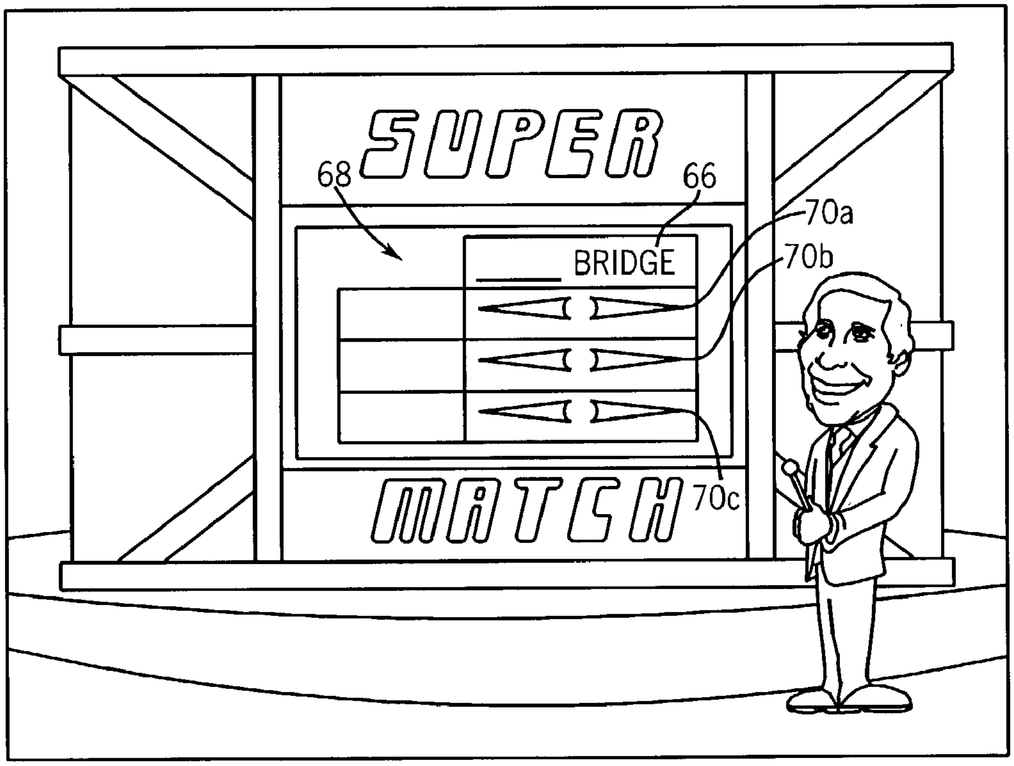

Referring to FIGS. 9 and 10, in the "Audience Match" portion the lower display 12 depicts the celebrities 60 selectable by the player to complete a short phrase 66 contained on a game board 68 depicted on the upper display 13. The phrase 66 may, for example, read as follows: "[blank] bridge." Below the phrase 66 are three ranked answers 70 for completing the phrase 66. The answers 70 are initially concealed from view. The player is prompted to select one of the celebrities 60 to provide an answer for completing the phrase 66. The celebrities 60 are randomly associated with the respective ranked answers 70. The association between the celebrities 60 and the ranked answers 70 may be weighted such that, for example, one celebrity is associated with the answer 70*a* ranked first, two celebrities are associated with the answer 70*b* ranked second, and three celebrities are associated with the answer 70*c* ranked third.

Figure 11:
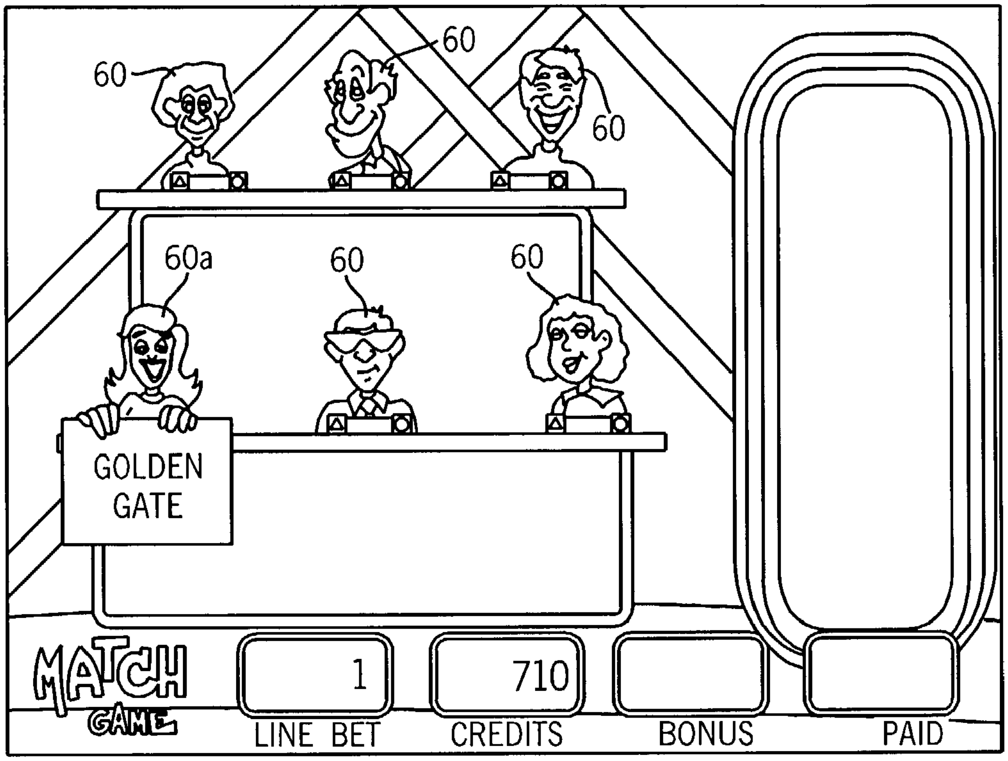
Figure 12:
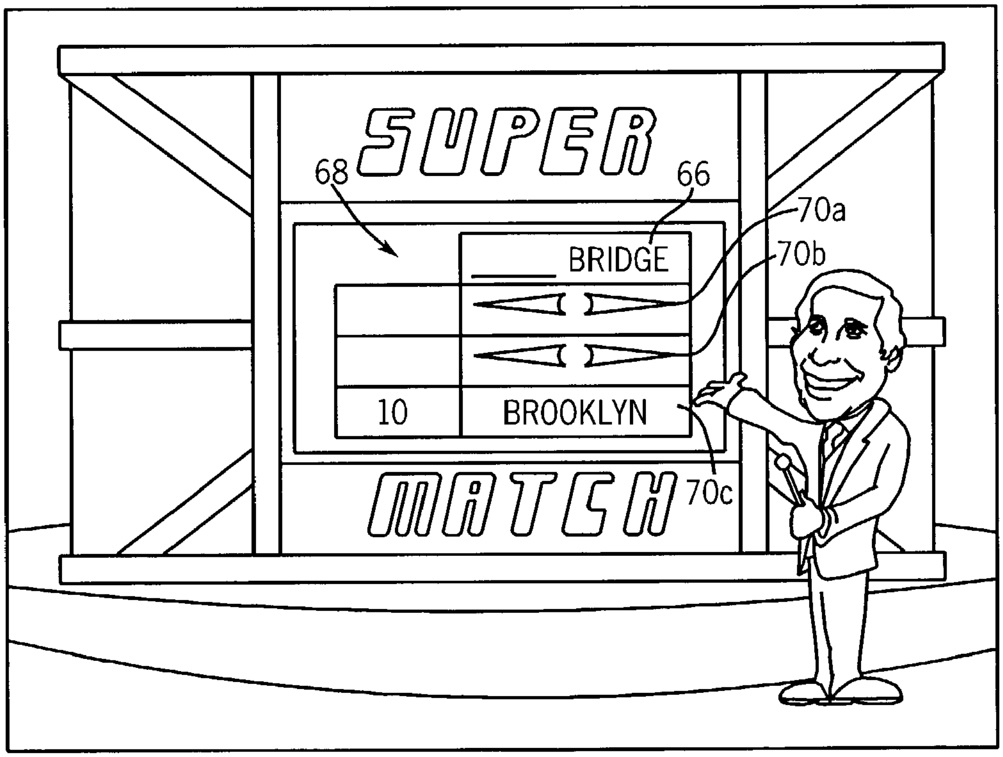
Figure 13:
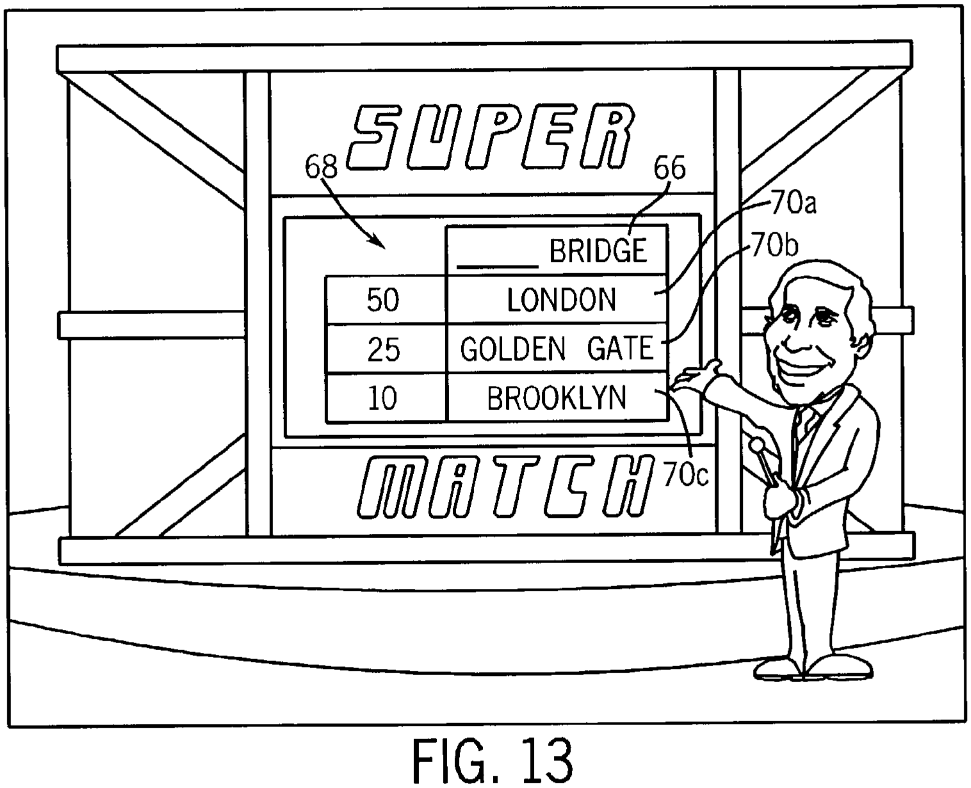

Referring to FIGS. 11 and 12, in response to one of the celebrities 60 being selected by the player via the touch screen, the selected celebrity 60*a* provides an answer that matches one of the concealed answers 70. The game board 68 then reveals the concealed answers 70, one at a time, starting from the lowest ranked answer 70*c* and ending with the highest ranked answer 70*a*. Referring to FIG. 13, the CPU awards a bonus based on a rank of the revealed answer that matches the selected celebrity's answer. The higher the rank of the revealed answer that matches the selected celebrity's answer, the higher the bonus. The bonus may, for example, be a credit amount multiplied by the player's line bet in the basic slot game. In the illustrated example, the selected celebrity 60*a* provides the answer, "golden gate", which matches the second-ranked answer 70*b* on the game board 68 to yield the second highest possible bonus (e.g., 25 credits). The bonuses associated with the other ranked answers 70 on the game board 68 are also shown to indicate what the player would have won by matching those answers instead. In an alternative embodiment, one or more of the celebrities 60 may provide answers that do not match any of the three ranked answers 70, in which case the CPU may nonetheless award a consolation bonus to the player.

Figure 14:
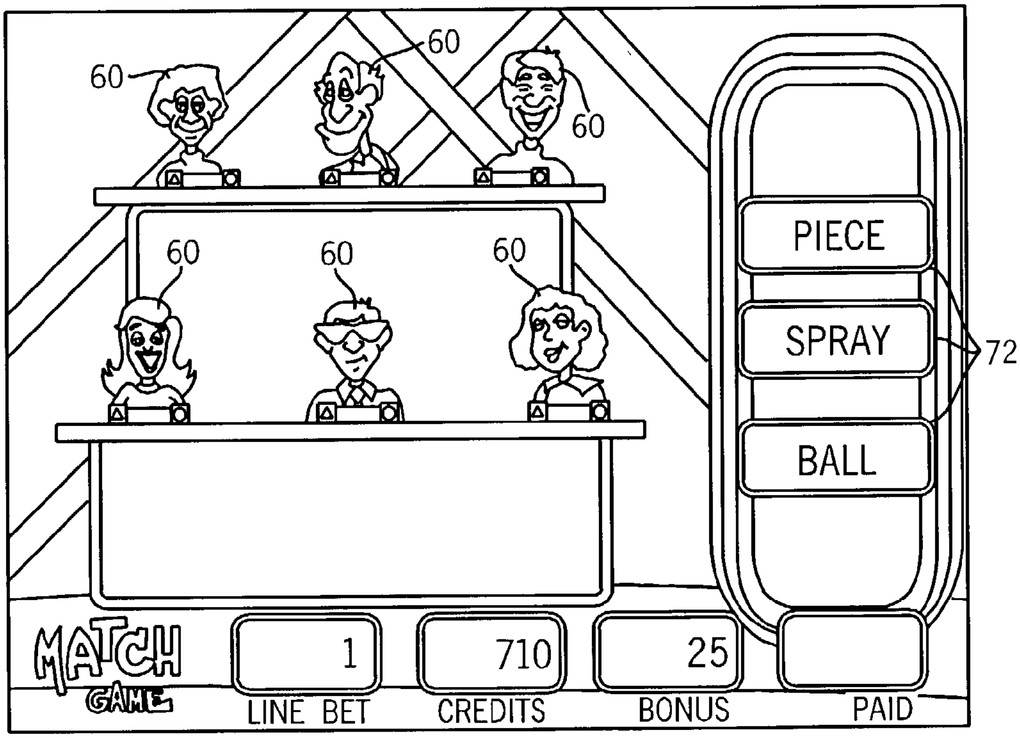
Figure 15:
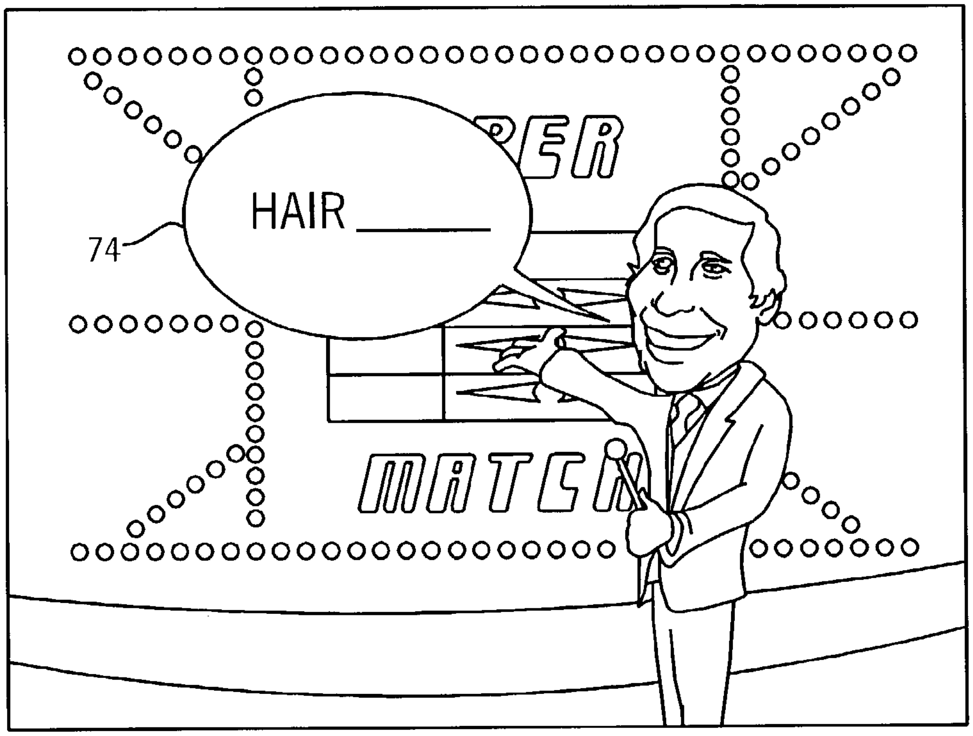

Referring to FIGS. 14 and 15, in the "Head to Head Match" portion of the SUPER MATCH bonus game the player can multiply his or her bonus from the "Audience Match" portion by up to a predetermined bonus multiplier, such as two (2×), three (3×), or four (4×). In the "Head to Head Match" portion the lower display 12 depicts the celebrities 60 and three possible answers 72 for completing a short phrase 74 read by the game show host (e.g., Gene Rayburn) on the upper display 13. The phrase 74 may, for example, read as follows: "Hair [blank]." The possible answers 72 for completing the phrase 74 may include "piece", "spray", and "ball".

Figure 16:
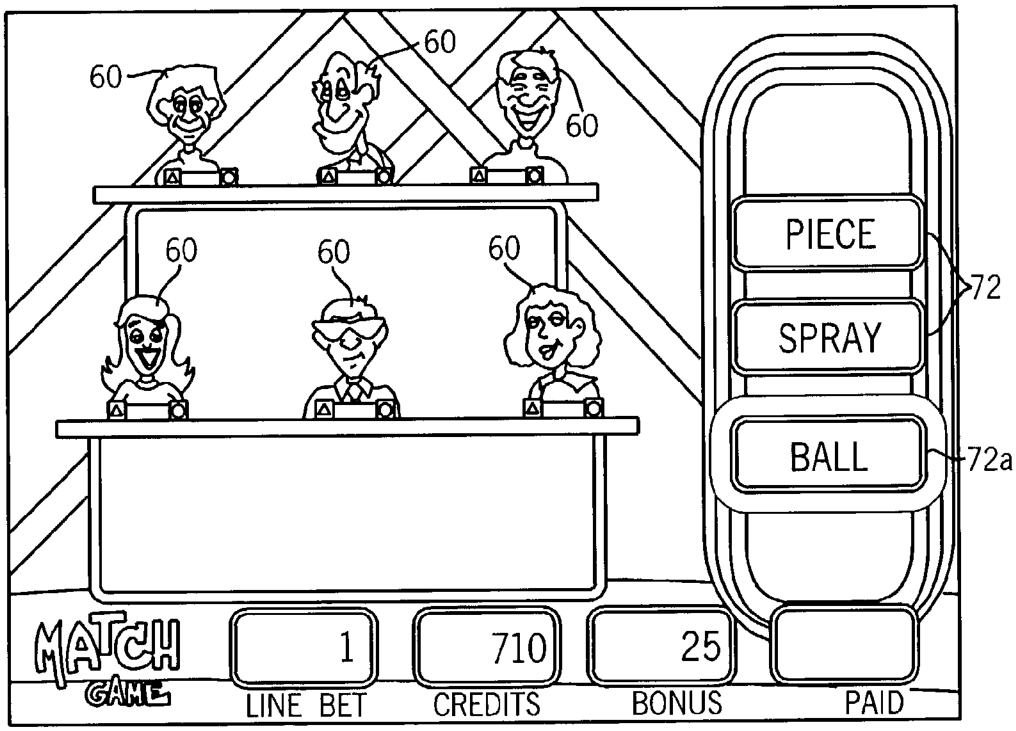
Figure 17:
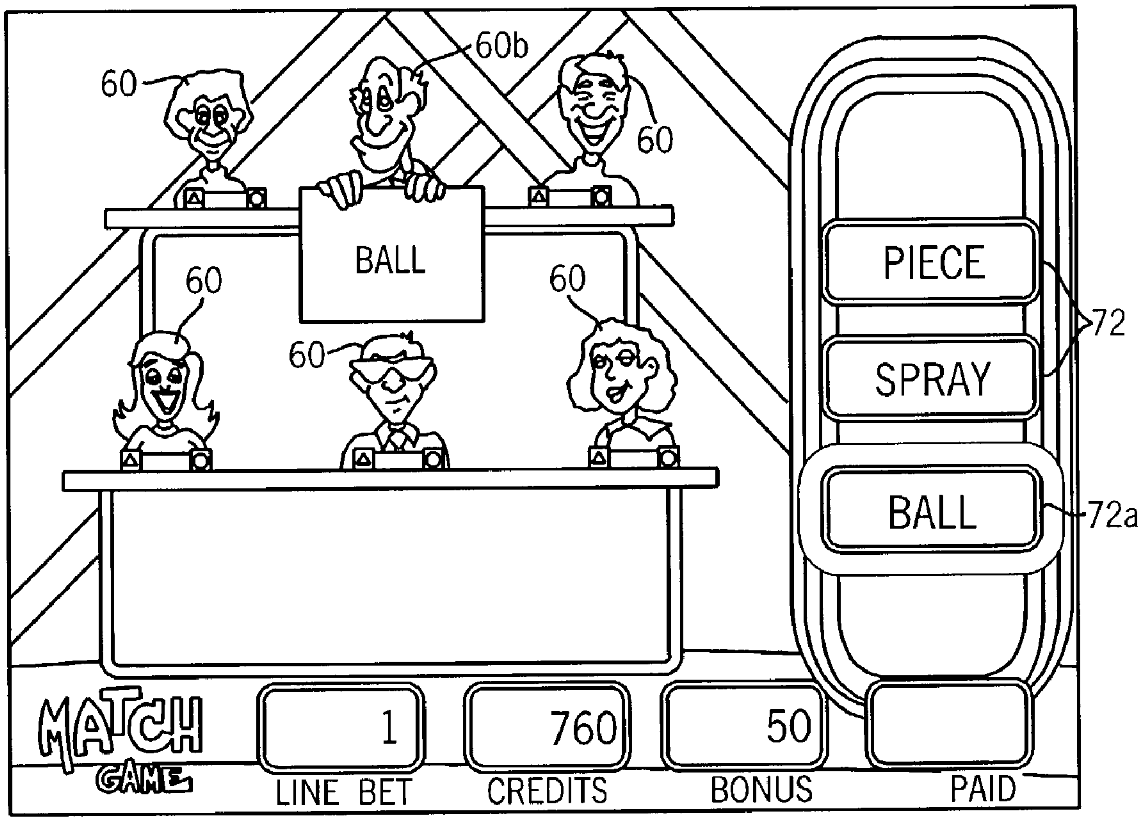

Referring to FIG. 16, the player is prompted to select one of the answers 72 for completing the phrase 74. Referring to FIG. 17, the player is then prompted to select one of the celebrities 60 which, in turn, reveals his or her answer. The celebrity may deliver a humorous remark as he or she reveals his or her answer. In the illustrated example, the player selects the answer 72*a*, "ball", and the selected celebrity 60*b* reveals the same answer.

In an alternative embodiment, instead of having the player select one of the celebrities 60, the CPU randomly makes this selection. To implement this random selection, the gaming machine 10 may be outfitted with a mechanical, video, or backlit wheel (not shown) having six sectors associated with the respective six celebrities. The wheel is spun and randomly stopped on one of the six sectors to select the associated celebrity. A portion of each sector may be specially marked with a doubling indicator to indicate that if the wheel stops on the doubling indicator, any bonus multiplier awarded in the "Head to Head Match" portion will be doubled.

By achieving a match between the player-selected answer 72*a* and the answer revealed by the selected celebrity 60*b*, the CPU multiplies the player's bonus from the "Audience Match" portion by a predetermined bonus multiplier. In the illustrated example, the player's bonus of 25 credits from the "Audience Match" portion is multiplied by two (2×) for a total bonus of 50 credits in the SUPER MATCH bonus game. If there is no match, the CPU nonetheless awards the bonus from the "Audience Match" portion. The CPU then shifts operation back to the basic slot game.

In an alternative embodiment, answers are not necessarily concealed prior to selection. For example, in the "Audience Match" portion of the SUPER MATCH bonus game, the possible answers 70 for completing the phrase 66 may be visible from the start of the "Audience Match" portion. Therefore, the game board 68 would initially appear as in FIG. 13. In another alternative embodiment, answers are not necessarily visible prior to selection. For example, in the "Head to Head Match" portion of the SUPER MATCH bonus game, the possible answers 72 for completing the phrase 74 may be concealed at the start of the "Head to Head Match" portion. The possible answers 72 in FIG. 14 would be concealed and represented by blank boxes. The selected answer 72*a* in FIGS. 16 and 17 would be revealed upon selection.

Figure 18:
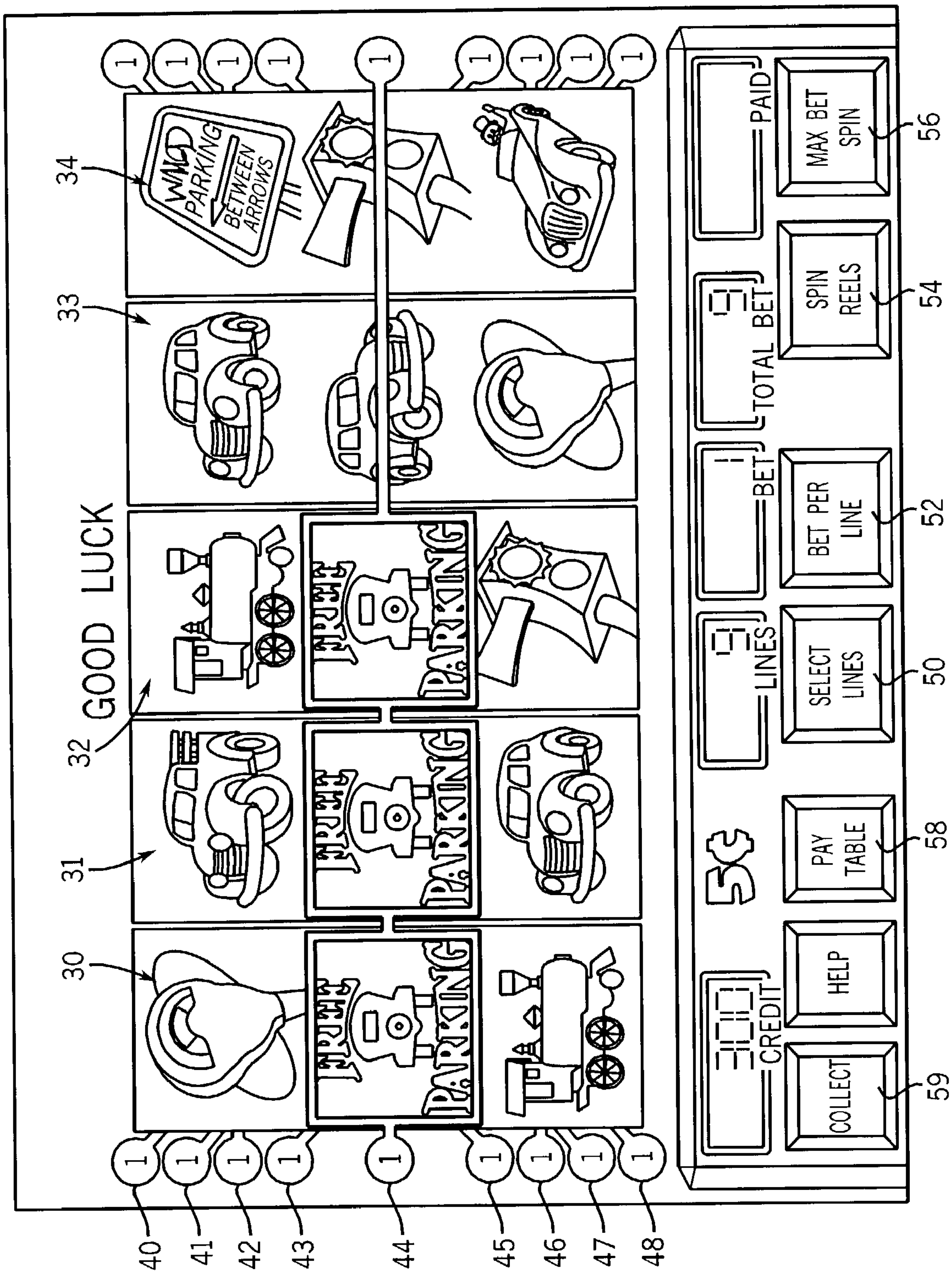
FIG. 18 a display image showing a start-bonus combination in the basic slot game for triggering a FREE PARKING bonus game.

The gaming machine 10 may be operable to play a wagering game having alternative bonus matching games and based on themes other than MATCH GAME. For example, referring first to FIG. 18, there is shown a basic slot game of a wagering game based on a MONOPOLY—FREE PARKING theme. The basic slot game employs reel symbols associated with this theme. The appearance of a start-bonus outcome on the reels 30–34 causes the CPU to shift operation from the basic game to a bonus matching game. In the illustrated embodiment, the appearance of three or more FREE PARKING logo symbols along an active pay line triggers a FREE PARKING bonus game.

Figure 19:
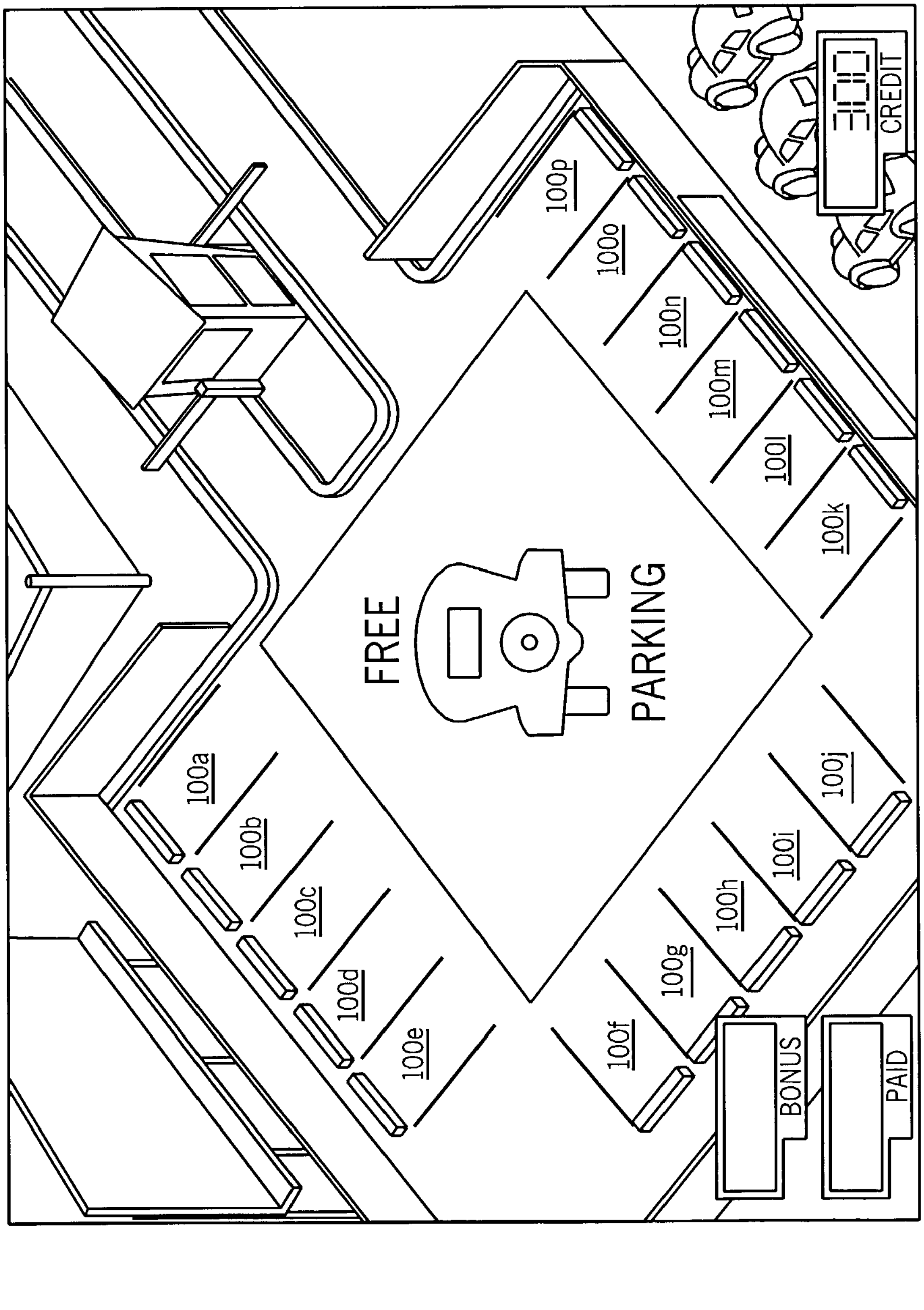
FIGS. 19 through 24 are display images associated with the FREE PARKING bonus game.
Figure 20:
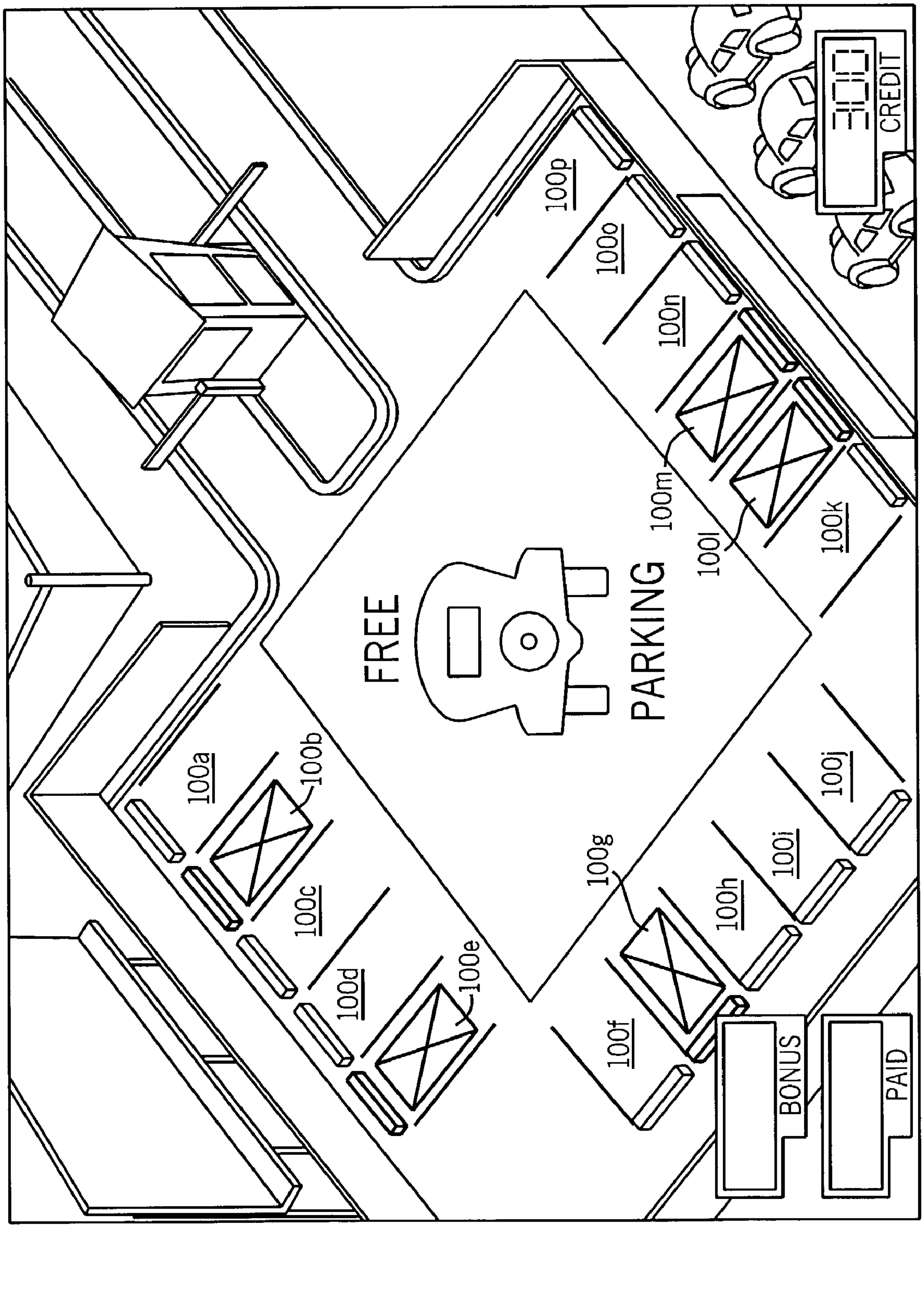

Referring to FIGS. 19 and 20, the FREE PARKING bonus game comprises a plurality of indicia 100 selectable by a player. The player-selectable indicia 100 are preferably a number of empty parking spaces, such as sixteen parking spaces, in a parking lot. The player is prompted to select a predetermined number, such as five, of the empty parking spaces 100. The number of empty parking spaces selected by the player is less than the total number of selectable parking spaces, and both the number selected and the total number selectable may be varied from what is illustrated. The player may make his or her selections via the touch screen. In the illustrated example, the player has selected parking spaces 100*b*, 100*e*, 100*g*, 100*l*, and 100*m*.

Figure 21:
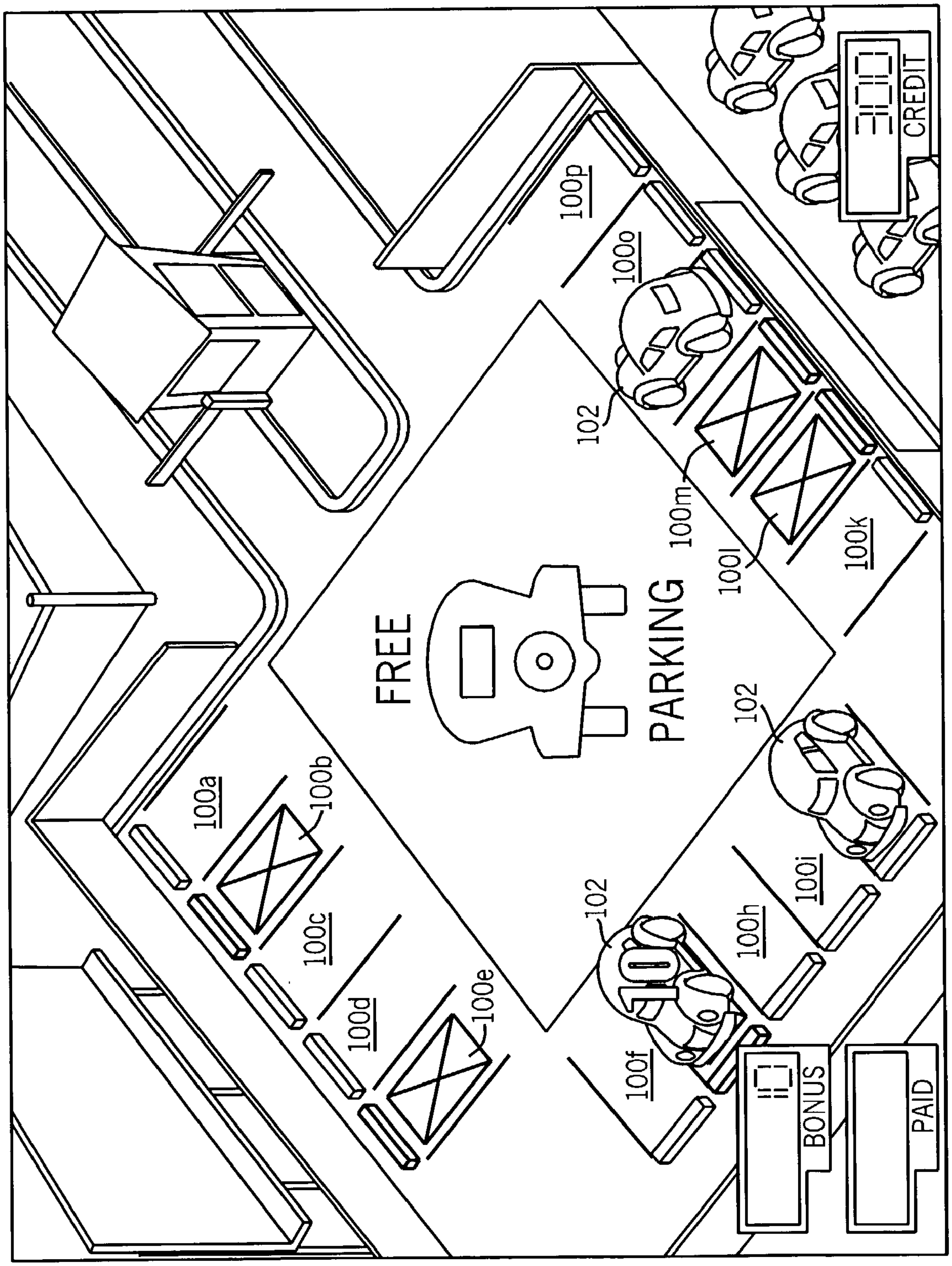
Figure 22:
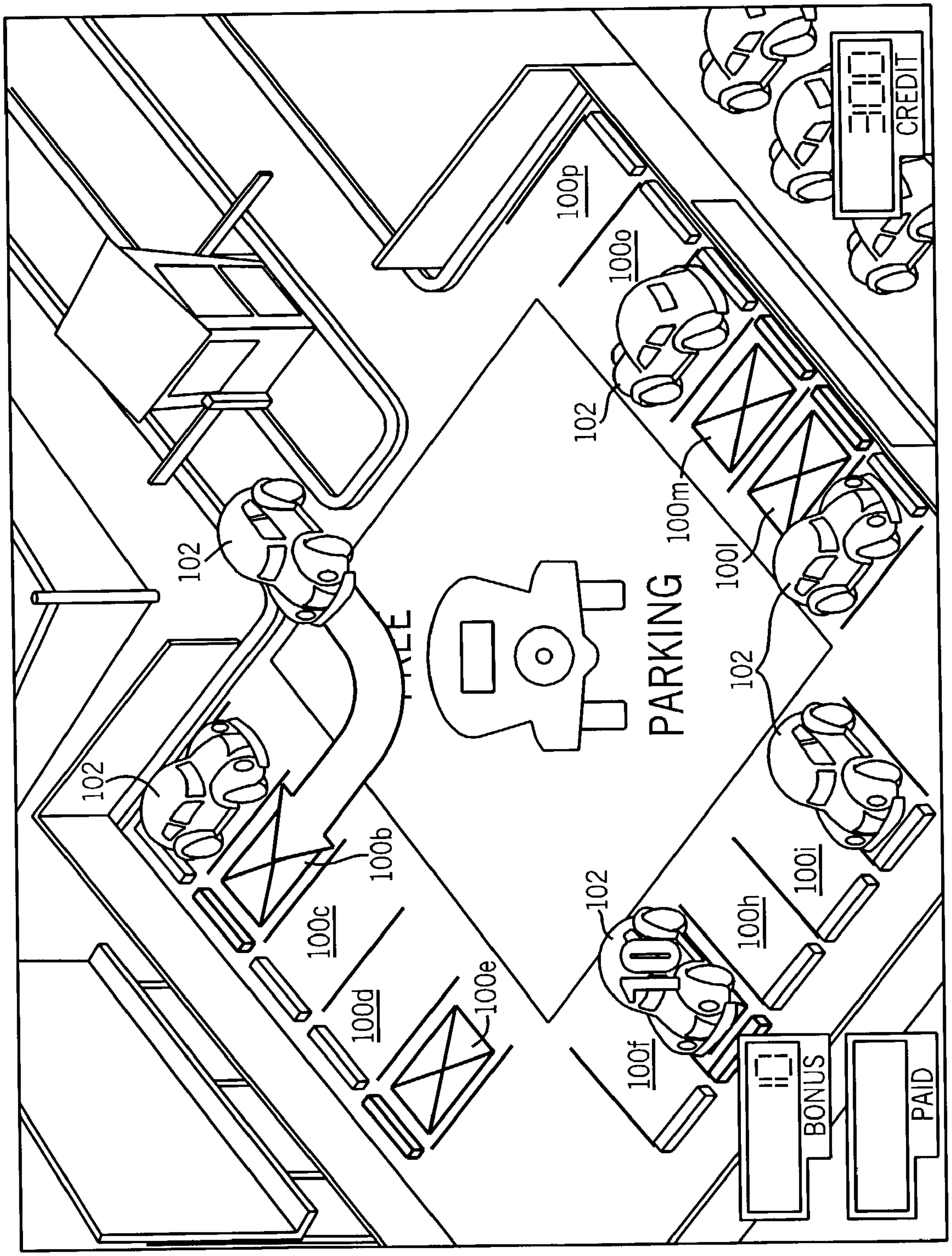
Figure 23:
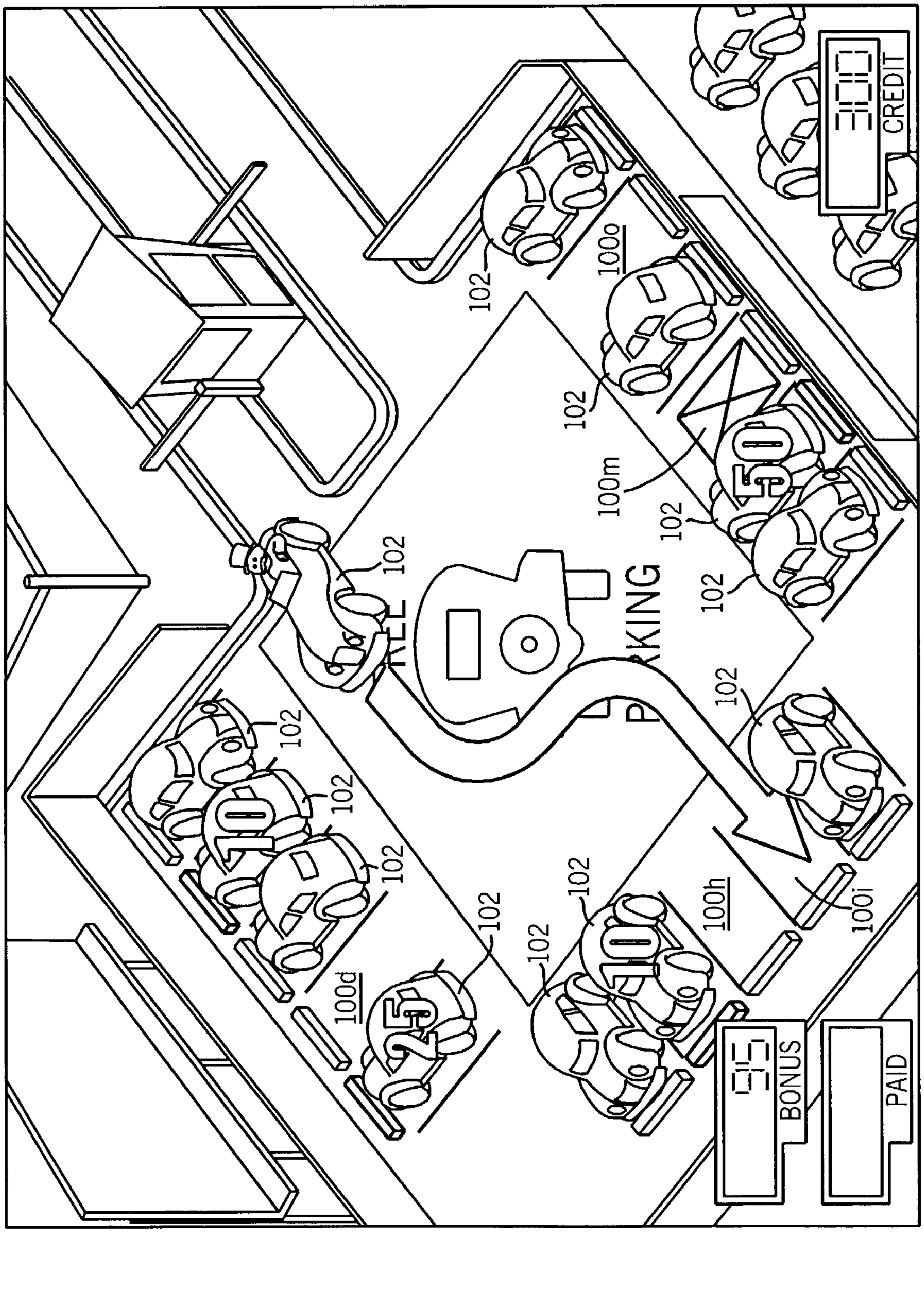

Referring to FIGS. 21, 22, and 23, after the player has selected the predetermined number of empty parking spaces 100, vehicles 102 begin to drive into the parking lot and park in empty parking spaces randomly selected by the CPU. The number of vehicles 102 that park in the parking lot may be predetermined or randomly selected. In the illustrated example, the number of vehicles 102 is randomly selected to be in a range from six to sixteen vehicles. If the number of vehicles 102 is randomly selected to be sixteen vehicles, the vehicles 102 would fill all the parking spaces in the parking lot. The last vehicle to park may, for example, be denoted by a car driven by Mr. Monopoly. Unusual events may, for example, include a vehicle parking in two adjacent spaces and multiple vehicles (e.g., motorcycles) parking in the same parking space. The gaming machine 10 may be provided with a secondary video display to show close-up animations of each vehicle entering the parking lot in its own humorous manner.

Figure 24:
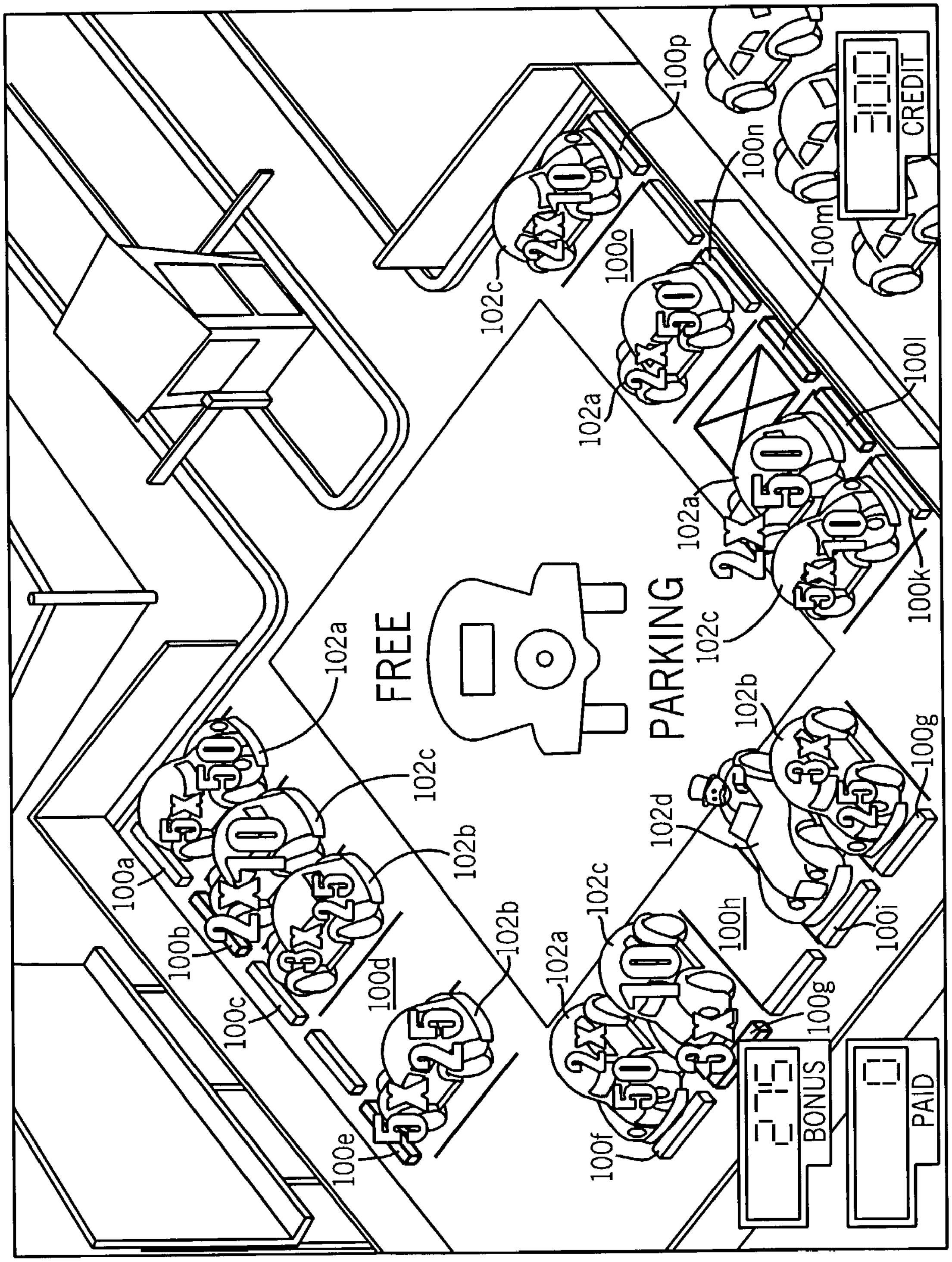

Referring to FIG. 24, after the vehicles 102 have concluded parking, the CPU awards a bonus for any vehicles 102 parked in parking spaces 100 previously selected by the player. The bonus is based on the type of vehicle in that player-selected parking space and a random multiplier assigned to each vehicle. Specifically, different types of vehicles 102 are preferably worth different numbers of credits. The vehicles 102 may be differentiated by color, shape, size, or other attribute. For example, vehicles 102*a* of a first color such as yellow may be worth a first number of credits (e.g., 50 credits); vehicles 102*b* of a second color such as red may be worth a second number of credits (e.g., 25 credits); vehicles 102*c* of a third color such as blue may be worth a third number of credits (e.g., 10 credits); and Mr. Monopoly's car 102*d* may be worth a fourth number of credits (e.g., 100 credits). The random multiplier for each vehicle 102 may, for example, range from one to five. The random multipliers appear after Mr. Monopoly parks his car. If a vehicle 102 parks in two adjacent parking spaces, the CPU may award a bonus for both spaces if they were selected by the player. Similarly, if multiple vehicles park in the same space, the CPU may award a bonus for each vehicle if the space was selected by the player.

In the illustrated example, the total bonus for the FREE PARKING bonus game may be calculated as follows:

| Parking Space (* = selected by player) | Vehicle Type | Award Bonus? | Vehicle Value in Credits | Multiplier | Space Bonus |
|---|---|---|---|---|---|
| 100a | 102c | NO | 50 | 5x | 0 |
| 100b* | 102a | YES | 10 | 2x | 20 |
| 100c | 102b | NO | 25 | 3x | 0 |
| 100d | — | NO | — | — | 0 |
| 100e* | 102b | YES | 25 | 5x | 125 |
| 100f | 102c | NO | 50 | 2x | 0 |
| 100g* | 102a | YES | 10 | 3x | 30 |
| 100h | — | NO | — | — | 0 |
| 100i | 102d | NO | 100 | 4x | 0 |
| 100j | 102b | NO | 25 | 3x | 0 |
| 100k | 102a | NO | 10 | 5x | 0 |
| 100l* | 102c | YES | 50 | 2x | 100 |
| 100m* | — | NO | — | — | 0 |
| 100n | 102c | NO | 50 | 2x | 0 |
| 100o | — | NO | — | — | 0 |
| 100p | 102a | NO | 10 | 2x | 0 |
| | | | | BONUS TOTAL | 275 |

From the above table, it can be seen that the player-selected empty parking spaces 100*b*, 100*e*, 100*g*, 100*l*, and 100*m* and that vehicles 102 parked in the respective spaces 100*b*, 100*e*, 100*g*, and 100*l*. No vehicle 102 parked in space 100*m*. Therefore, bonuses are awarded for the parking spaces 100*b*, 100*e*, 100*g*, and 100*l*, but not for parking space 100*m*. Vehicle type 102*a* parked in space 100*b* and yielded a bonus of 20 credits based on the vehicle's value of 10 credits and a random multiplier of 2×. Vehicle type 102*b* parked in 100*e* and yielded a bonus of 125 credits based on the vehicle's value of 25 credits and a random multiplier of 5×. Vehicle type 102*a* parked in space 100*g* and yielded a bonus of 30 credits based on the vehicle's value of 10 credits and a random multiplier of 3×. Finally, vehicle type 102*c* parked in space 100*l* and yielded a bonus of 100 credits based on the vehicle's value of 50 credits and a random multiplier of 2×. Accordingly, the total bonus was 275 credits.

While the present invention has been described with reference to one or more particular embodiments, those skilled in the art will recognize that many changes may be made thereto without departing from the spirit and scope of the present invention. For example, instead of simulating the reels on a video display, the reels may be mechanical and driven by respective stepper motors. If the reels are mechanical, the bonus game is animated on one or more separate video displays. Each of these embodiments and obvious variations thereof is contemplated as falling within the spirit and scope of the claimed invention, which is set forth in the following claims.

What is claimed is:

1. A method of conducting a wagering game on a gaming machine comprising:

receiving a wager from a player;

providing a plurality of revealed first elements;

selecting only one first element from the plurality of revealed first elements;

providing a plurality of second elements, each of said second elements being associated with one of said revealed first elements;

selecting multiple ones of the second elements;

comparing the selected one of the first elements to the selected ones of the second ones revealing the selected ones of the second elements; and awarding a payout related to a number of matches between the selected first element and the selected ones of the second elements.

2. The method of claim 1, wherein the first elements are associated with a corresponding indicia and the plurality of second elements are each associated with one of said indicia, and wherein the comparing step includes comparing the indicia of the selected first element to the indicia of the selected ones of the second elements.

3. The method of claim 2, wherein the indicia of the second elements are initially concealed but are revealed at least one of during the comparing step and subsequent to the comparing step.

4. The method of claim 2, wherein the first and second indicia include possible words for completing a word phrase.

5. The method of claim 1, wherein the selecting step is responsive to input from the player.

6. The method of claim 1, wherein the comparing step includes comparing the selected first element to all of the second elements in the second group.

7. The method of claim 1, wherein the awarding step includes awarding the payout based on a number of matches between the selected first element and the one or more second elements in the second group.

8. The method of claim 7, wherein the payout increases as the number of matches increases.

9. The method of claim 1, wherein each of the second elements matches one of the first elements.

10. The method of claim 1 wherein each of the first elements matches one of the second elements.

11. The method of claim 1, wherein the plurality of revealed first elements and the plurality of second elements are associated with locations in a single array.

12. The method of claim 1, wherein said act of selecting only one first element from the plurality of revealed first elements comprises a player input.

13. The method of claim 1, wherein said act of selecting multiple ones of the second elements comprises a player input.

14. The method of claim 1, wherein the first elements are associated with a first array and the second elements are associated with a second array.

15. A gaming machine comprising:
- a wagering apparatus for receiving a wager from a player;
- a display for displaying a plurality of first elements and a plurality of second elements; and
- processing circuitry for
  - selecting only one of said plurality of first elements;
  - providing a plurality of second elements, each of said second elements being associated with one of said revealed first elements;
  - selecting multiple ones of the second elements;
  - comparing the selected first element to the selected ones of said second elements revealing the selected ones of the second elements; and
  - awarding a payout related to a number of matches between the selected first element and the selected ones of said second elements.

16. The machine of claim 15, wherein the processing circuitry selects a first element from the plurality of first elements responsive to input from the player.

17. The gaming machine of claim 15, wherein said processing circuitry is configured to perform said act of selecting only one first element from the plurality of revealed first elements responsive to a player input.

18. The gaming machine of claim 15, wherein said processing circuitry is configured to perform said act of selecting multiple ones of the second elements responsive to a player input.

* * * * *